United States Patent [19]

Delhaye et al.

[11] Patent Number: 5,164,786
[45] Date of Patent: Nov. 17, 1992

[54] DISPERSIVE SPECTROMETRY INSTALLATION WITH MULTI-CHANNEL DETECTION

[75] Inventors: Michel Delhaye, Villeneuve D'Asco; Edouard Da Silva, Lille; Bernard Roussel, Valenciennes, all of France

[73] Assignee: Dilor, Lille, France

[21] Appl. No.: 720,708

[22] Filed: Jun. 25, 1991

[30] Foreign Application Priority Data

Jul. 3, 1990 [FR] France .............................. 90 08407

[51] Int. Cl.$^5$ .......................... G01J 3/06; G01J 3/18
[52] U.S. Cl. ..................................... 356/326; 356/328
[58] Field of Search ............... 356/326, 328, 333, 334

[56] References Cited

U.S. PATENT DOCUMENTS

| | | | |
|---|---|---|---|
| 4,326,802 | 4/1982 | Smith, Jr. et al. | 356/316 |
| 4,455,087 | 6/1984 | Allemand et al. | 356/333 |
| 4,523,845 | 6/1985 | Erme et al. | 356/333 |
| 4,930,892 | 6/1990 | Hadbawnik et al. | 356/328 |

OTHER PUBLICATIONS

Applied Spectroscopy, vol. 44, No. 5, Jun. 1990, pp. 776-782, Knoll et al., "Improving Spectroscopic Techniques . . . ".

Sovient Inventions Illustrated, SU A-817489 Mar. 30, 1981.
Patent Abstracts of Japan, JP-A-59-063533, Apr. 11, 1984.

*Primary Examiner*—Vincent P. McGraw
*Attorney, Agent, or Firm*—Dennison, Meserole, Pollack & Scheiner

[57] ABSTRACT

The invention relates to a spectrometry installation comprising an inlet, optical fiber means suitable for receiving an inlet beam and delivering a spectrally dispersed image of the beam which image is limited to a selected spectral band, a multi-channel detection module receiving said spectral image, and processor means. The optical filter means are provided with a deflector stage. Control means are associated with the optical deflector means to define the spectral band in terms of center frequency and band width, and control means are associated therewith for displacing the spectral image over the detection module. An electronic control unit is provided to control the control means and to control the processor means in a plurality of operating modes, each of which comprises joint control of the selected spectral band, of the displacement of the spectral image, and of the processor means, for the purpose of selectively using a particular set of detector components.

11 Claims, 7 Drawing Sheets

DISPERSIVE SPECTROMETRY INSTALLATION WITH MULTI-CHANNEL DETECTION

The invention relates to dispersive spectrometry with multi-channel detection.

It is generally applicable to instrumental spectrometry and in particular to absorption, emission, diffusion, fluorescence, Raman, etc. spectrometry.

BACKGROUND OF THE INVENTION

Dispersive spectrometry installations having single channel detection have been known for a long time.

In general, this type of installation comprises:

an inlet slit illuminated by a beam of electromagnetic radiation to be analyzed;

a dispersive stage having an outlet slit for delivering a dispersed spectral image of said beam, the image being limited to a selected band of the spectrum;

a single channel detection module receiving said spectral image via said outlet slit; and processor means for analyzing the signals received by the single-channel detection module.

In practice, the single-channel detection module comprises photoelectric detector components such as photocells, photomultipliers, or thermopiles.

In operation, a single spectral component of the electromagnetic radiation to be analyzed passes through the outlet slit and is consequently detected by the single-channel detection module. As a result, the dispersive component needs to be displaced to cause each of the other spectral components to pass through the outlet slit.

Now that integrated detector components such as photodiode strips and charge transfer devices are available and can advantageously be coupled with image intensifier systems, single-channel detection is often replaced by multi-channel detection, since with multi-channel detection the dispersed spectral image can be projected directly onto the multi-channel detection module, i.e. without passing through an outlet slit, thereby enabling a plurality of spectral components of the electromagnetic radiation to be detected simultaneously without altering the configuration of the installation.

However, signal acquisition for obtaining the spectrum of the electromagnetic radiation to be analyzed takes place when the dispersed spectral image of said electromagnetic radiation is stationary relative to the multi-channel detection module, thereby limiting the width of the spectrum to the geometrical dimensions of the detection module and limiting the spectral resolution of the installation to that of the detector components.

In addition, when an image intensifier system is coupled with the detector components, successive spectra are always observed using the same light-emitting phosphors. As a result the speed of said phosphors determines the time resolution of the installation.

Furthermore, the level of interfering light due to light being diffused by the dispersive component or by the other optical components is higher than in single-channel detection installations. With single-channel detection, this level is proportional to the area of the inlet and outlet slits which are generally chosen to be very narrow (e.g. a few tens of micrometers across). With multi-channel detection, the level of interfering light is proportional to the area of the detection module (of the order of a few square centimeters) given that the dispersed spectral image from the dispersive stage is projected directly onto the detection module (there is no outlet slit with multi-channel detection).

Finally, the signal-to-background noise ratio of the installation is unsatisfactory, in particular because of noise due to the detection module itself, noise induced by external disturbances, and photon noise generated by the detection module being illuminated by a continuous background of interfering light or by interfering spectral bands.

SUMMARY OF THE INVENTION

The present invention provides a dispersive spectrometry installation with multi-channel detection and comprising:

an inlet for a beam of electromagnetic radiation to be analyzed;

optical filter means suitable for receiving the inlet beam and for delivering a dispersed spectral image of said beam, which image is limited to a selected spectral band;

a multi-channel detection module comprising a plurality of detector components receiving said spectral image; and processor means for analyzing the signals detected by said detector components.

According to a general definition of the present invention:

the optical filter means are provided with at least one deflector stage;

the optical filter means are associated:

with first control means to define said spectral band in center frequency and in band width; and with second control means suitable for displacing the spectral image over the multi-channel detection module;

and an electronic control unit is provided suitable for controlling the first and second control means and the processor means in a plurality of operating modes, each of which includes joint control of said selected spectral bands, of the displacement of the spectral image, and of the processor means, to use a selected particular set of the detector components.

In practice, for each operating mode, the electronic control unit adapts the joint control parameters of the selected spectral band, of the displacement of the spectral image, and of the processor means to comply with a law which is predetermined to obtain selected magnification of the spectral image on the particular set of detector components.

This magnification of the dispersed spectral image makes it possible to obtain a spectrum width of the electromagnetic radiation to be analyzed that is not limited by the geometrical dimensions of the detection module.

Thus, by virtue of the invention, the spectral resolution of the installation is no longer limited by the geometrical dimensions of the detector components.

In addition, the time resolution of the installation is no longer dependent on the speed of the light-emitting phosphors of the image intensifier tube insofar as successive spectra are now observed on different phosphors by virtue of the dispersed spectral image being displaced over the detection module.

In addition, the level of interfering light due to light being diffused by the dispersive components is reduced by the narrow passband optical filter means.

Finally, the signal-to-noise ratio in the installation is improved by the selective electronic reading of the detector components excited by the dispersed spectral image.

In another aspect of the invention, the joint control parameters of the selected spectral band, of the displacement of the spectral image, and of the processor means are adapted continuously, thereby making it possible to continuously vary the selected magnification of the spectral image on the particular set of detector components.

In yet another aspect of the invention, the joint control parameters of the selected spectral band, of the displacement of the spectral image, and of the processor means are adapted sequentially, thereby making it possible to sequentially vary the selected magnification of the spectral image on the particular set of detector components.

In one embodiment of the invention, the selected magnification of the spectral image enlarges the dispersion of said spectral image over the particular set of detector components.

In another embodiment of the invention, the selected magnification of the spectral image contracts the dispersion of said image on the particular set of detector components.

In practice, the deflector stage possesses at least one dispersive optical component selected from the group constituted by diffraction gratings and prisms.

In a variant, the deflector stage possesses at least one optical component selected from the group constituted by: lenses, plane mirrors, both spherical and aspherical mirrors, holographic systems, slits, and interferometers.

In yet another variant, the deflector stage possesses at least one optoelectronic component selected from the group constituted by: detector component intensification systems coupled where appropriate with shutter means for the detector components, slit scanning cameras, and optical magnification systems.

Advantageously, the deflector stage is housed in the detection module.

In practice, the detection module comprises N detector components disposed in a row extending parallel to the dispersion of the beam of electromagnetic radiation to be analyzed, and the selected magnification of the spectral image over the particular set of detector components is parallel to said dispersion of the beam of electromagnetic radiation.

In a variant, the detection module comprises N detector components disposed in m rows extending parallel to the dispersion of the beam of electromagnetic radiation and in p columns disposed perpendicularly to the dispersion of said beam, and the selected magnification of the spectral image over the m' particular rows and p' particular columns constituting the selected particular set of detector components is parallel to the dispersion of the beam of electromagnetic radiation over said m' particular rows and perpendicular to the dispersion of the beam of radiation over said p' particular columns.

Preferably, the optical filter means comprise order separator means suitable for being controlled by the electronic control unit.

BRIEF DESCRIPTION OF THE DRAWINGS

Embodiments of the invention are described by way of example with reference to the accompanying drawings, in which.

DETAILED DESCRIPTION

Figure 1:
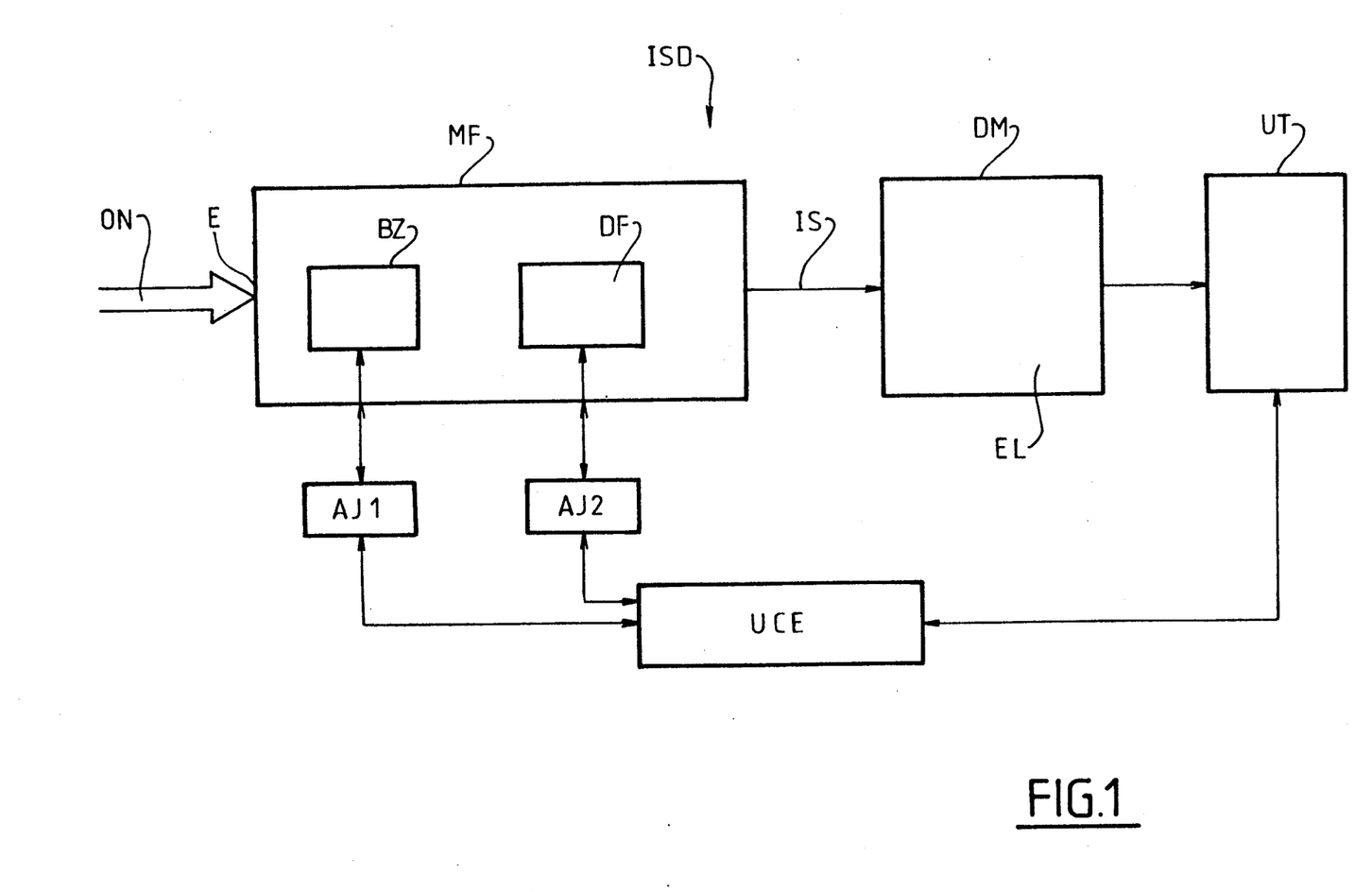
FIG. 1 is a diagram of a dispersive spectrometry installation with multi-channel detection in accordance with the invention.

In FIG. 1, reference ISD designates a dispersive spectrometry installation having multi-channel detection and in accordance with the invention.

In conventional manner, the installation ISD comprises:

an inlet E for a beam of electromagnetic radiation ON to be analyzed;

optical filtering means MF suitable for receiving the inlet beam ON and for delivering a dispersed spectral image IS of the beam, which image is limited to a selected spectral band BZ;

a multi-channel detection module DM comprising a plurality of detector components EL receiving said spectral image IS; and processor means UT for analyzing the signals detected by said detector components EL.

According to a general definition of the invention, the optical filter means MF are provided with at least one deflector stage DF.

The optical filter means MF are associated with:

first control means AJ1 for defining said spectral band, both in center frequency and in band width; and second control means AJ2 suitable for displacing the spectral image IS over the multi-channel detection module DM.

An electronic control unit UCE is provided suitable for controlling the first and second control means AJ1 and AJ2 and the processor means UT in various different operating modes, each of which includes joint control of said selected spectral band, of the displacement of the spectral image, and of the processor means, thereby making use of a selected particular set of the detector components.

The Applicants have observed that the optical filtering means MF defining the spectral band in terms of center frequency and bandwidth correspond to an optical mask isolating a spectral window of selected dimensions, and that using a selected particular set of the detector components in a manner corresponding to the optical mask defined in this way is equivalent to providing an electronic mask that takes account only of the selected set of detector components.

In addition, the Applicants have observed that in each operating mode, the electronic control unit UCE can adapt the parameters of its joint control of the selected spectral band (i.e. the optical mask), of the displacement of the spectral image, and of the processor means UT (i.e. the electronic mask) in compliance with a predetermined law to obtain selected magnification of the dispersed spectral image on the particular set of detector components EL.

This selected magnification of the dispersed spectral image on the particular set of detector components in accordance with the invention improves the performance of a spectrometry installation with multi-channel detection, particularly with respect to sensitivity and to the speed with which the signals detected by the detector components can be read.

It is possible, in accordance with the invention, to adapt the parameters of the joint control of the selected spectral band, of the displacement of the spectral image, and of the processor means on a continuous basis, thereby making it possible to continuously vary the magnification of the dispersed spectral image on the particular set of detector components.

It is also possible, in accordance with the invention, to adapt the parameters of the joint control of the selected spectral band, of the displacement of the spectral image, and of the processor means sequentially, thereby making it possible to sequentially vary the magnification of the dispersed spectral image on the particular set of detector components.

In other words, by sequentially adapting the control parameters it is possible to select predetermined portions of the spectrum with the respective spectral images thereof being subjected to different magnifications by means of the invention, and to put these spectral images end to end on the detector module. Such sequential adaptation is particularly suited to analyzing a complicated spectrum having a large number of spectrum lines.

Figure 2:
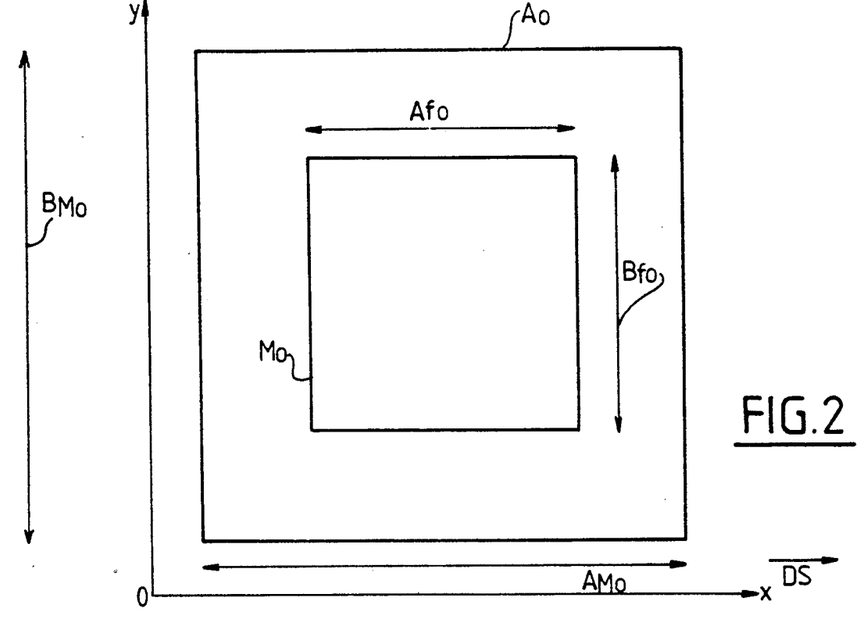
FIG. 2 is a diagram showing an optical mask defined by the dispersive stage of the invention.

Reference is now made to FIG. 2 which is a diagram of an optical mask corresponding to the spectral band defined by the optical filter means.

The optical mask Mo is drawn in a parallelogram Po of width Amo (in the X-axis direction OX) and of height Bmo (in the Y-axis direction OY).

By convention, spectral dispersion DS is parallel to the X-axis OS and perpendicular to the Y-axis OY.

The spectral window defined by the optical mask Mo has width Afo (in the X-axis direction OX) and height Bfo (in the Y-axis direction OY).

Under control from the electronic control unit UCE, the control means AJ1 adjust the dimensions Afo and Bfo of the spectral window, i.e. the spectral band.

It should be observed that outside the areas delimited by the width Afo and the height Bfo, the optical mask Mo is opaque to electromagnetic radiation, whereas it is transparent to electromagnetic radiation within said mask.

Reference is again made to FIG. 1.

The multi-channel detection module DM is, for example, preceded by an image intensifier tube (not shown) in which electrons emitted by a photocathode receiving the spectral image are accelerated and directed towards a micro-channel plate which performs amplification by secondary emission. The beams of secondary electrons are accelerated and strike a phosphor screen which is optically coupled to the detector components.

By way of example, the phosphors of the light-emitting surface (not shown) may be coupled to the detector components EL of the multi-channel detection module by means of a bundle of optical fibers OF.

The multi-channel detection module DM is followed by processor means UT controlled by the electronic control unit UCE to establish a plurality of electromagnetic radiation spectra S as a function of the signals received by the detection module.

For example, the processor means UT may include measurement means (not shown) suitable for processing the signals delivered by the detector components of the detection module as a function of reference signals delivered by a reference memory (not shown) suitable for containing a library of spectra.

The detection module may be one-dimensional (not shown) and may comprise N detector components disposed in a row extending parallel to the dispersion of the beam of electromagnetic radiation to be analyzed.

With such a one-dimensional detector, the magnification of the dispersed spectral image on the particular set of detector components is parallel to said dispersion of the beam of electromagnetic radiation.

Figure 3:
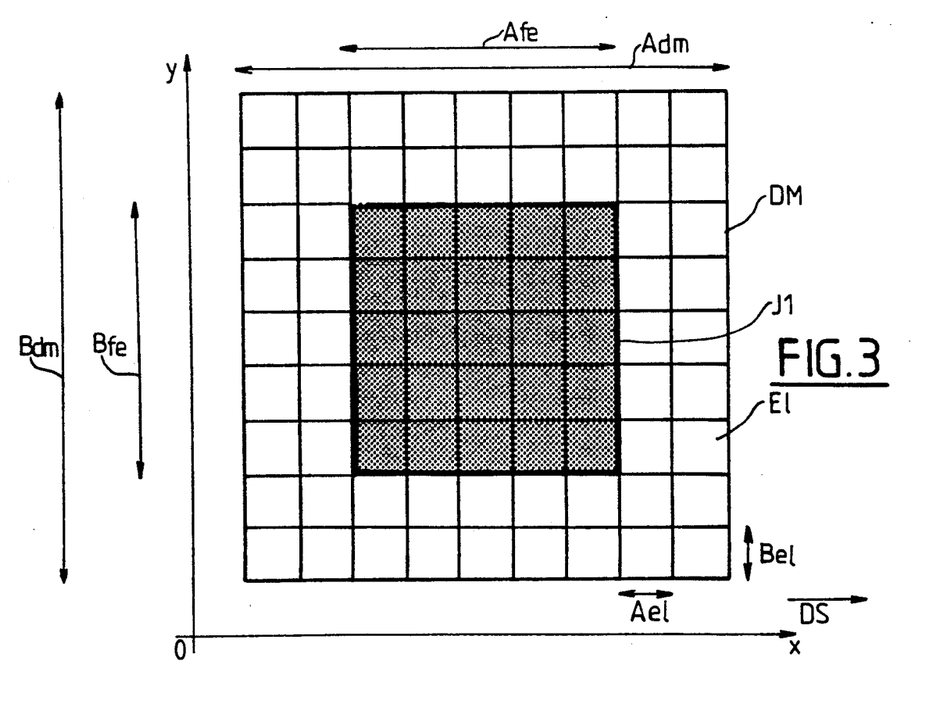
FIG. 3 is a diagram of an electronic mask defined by the detection module of the invention in correspondence with the optical mask of FIG. 2.

Reference is now made to FIG. 3 which shows an electronic mask defined by a two-dimensional detection module and corresponding to the optical mask described with reference to FIG. 2.

The two-dimensional detection module DM comprises N detector components EL disposed in m rows extending parallel to the dispersion of the beam of electromagnetic radiation DS, and p columns extending perpendicularly to the dispersion of said beam (in this case both m and p are equal to 9).

Each detector component EL has width Ael and height Bel.

The two-dimensional detection module has height Bdm and width Adm.

In accordance with the invention, an electronic mask making use of a selected particular set of detector components J1 (shaded in FIG. 3) having a total width Afe and a total height Bfe is associated to correspond with the optical mask Mo described with reference to FIG. 2.

It should be observed that the electronic mask makes it possible to take account solely of the set of detector components J1.

In practice, each optical mask is associated with an electronic mask making use of a selected particular set of detector components.

For a two-dimensional detector as described with reference to FIG. 3, the magnification of the dispersed spectral image is parallel to said dispersion of the beam of electromagnetic radiation over the m' rows (where m' is equal to 5 in this case) of the particular set J1 of detector components, and perpendicular to said dispersion over the p' columns of the particular set J1 of detector components (where p' is equal to 5 in this case).

Figure 4:
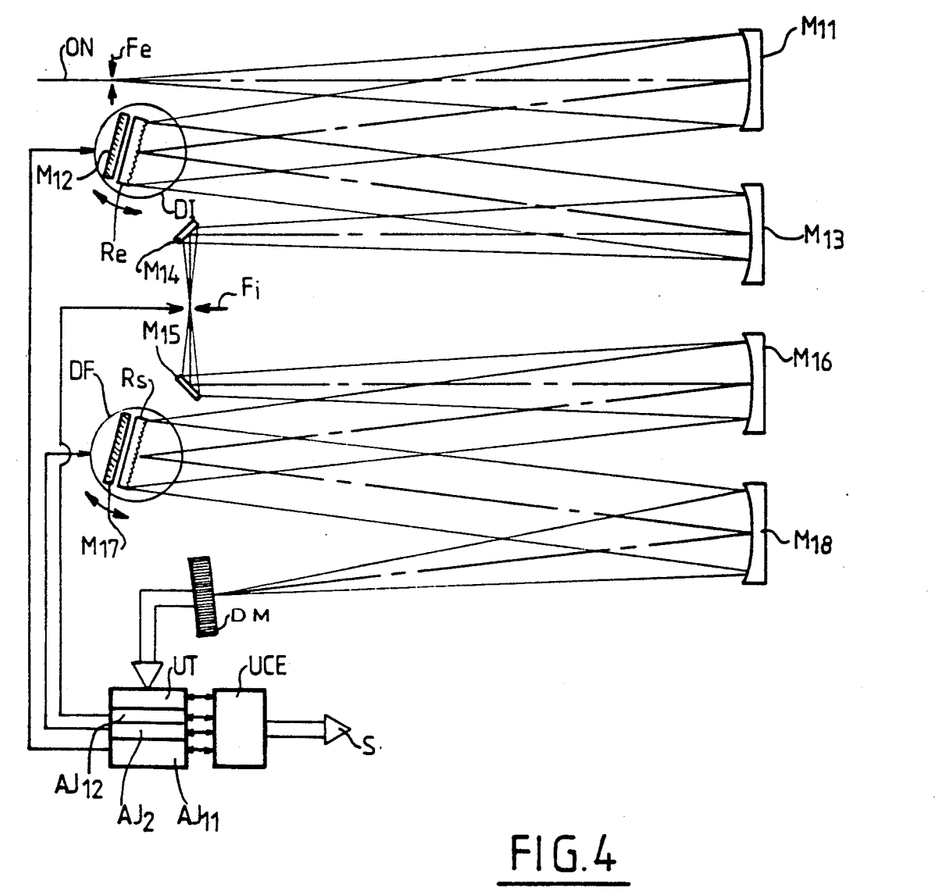
FIG. 4 is a diagram showing one example of a dispersive spectrometry installation with multi-channel detection in accordance with the invention and having a grating type deflector stage.

Reference is now made to FIG. 4 which shows one example of an installation of the invention which includes a deflector stage of the dispersive grating type.

A lens (not shown) focuses the electromagnetic radiation to be analyzed on an inlet slit Fe.

The inlet beam is received by a dispersive stage DI comprising, for example, a dispersive grating Re disposed between two mirrors M11 and M13. Advantageously, a mirror M12 is stuck to the back of the grating Re.

A mirror M14 focuses the dispersed spectral image from the mirror M13 on an intermediate slit Fi of adjustable width to select the bandwidth of the spectral band of electromagnetic radiation that is transmitted to a deflector stage DF via a mirror M15.

The deflector stage DF comprises, for example, a dispersive grating Rs disposed between two mirrors M16 and M18. Advantageously, a mirrow M17 is stuck to the back of the grating Rs.

In this case, the inlet slit Fe and the intermediate slit Fi are optically conjugate to each other.

In addition, the width of the inlet slit Fe satisfies a predetermined condition relating to the area of the detector components of the multi-channel detector module to define the spectral resolution of the installation.

Under the control of the electronic control unit UCE, control means AJ12 adjust the width of the intermediate slit Fi and the position thereof for the purpose of determining the selected spectral band, i.e. the dimensions of the optical mask Mo described with reference to FIG. 2.

Thereafter, under the control of the electronic control means UCE, control means AJ11 displace the grating Re at a control velocity V1 enabling a selected dispersed image to enter the deflector stage.

Finally, under the control of the electronic control unit UCE, the control means AJ12 displace the grating Rs at a controlled velocity V2 to displace the spectral image relative to the detection module.

It should be observed here that the velocities V1 and V2 are the displacement velocities of the spectral images measured in the plane of the detection module.

Where applicable, and under the control of the electronic control unit UCE, the processor means UT displace the particular set J1 at a controlled velocity V3.

Most advantageously, the electronic control unit UCE adapts the joint control parameters (e.g. V1, V2, and V3) of the spectral band (optical mask), of the displacement of the dispersed spectral image, and of the processor means (electronic masks) to comply with a law that is predetermined to obtain selected magnification of the dispersed spectral image on the particular set J1 of detector components.

It should be observed that the invention is well suited to use with optical filter means MF fitted with order separator means (not shown).

Figure 5:
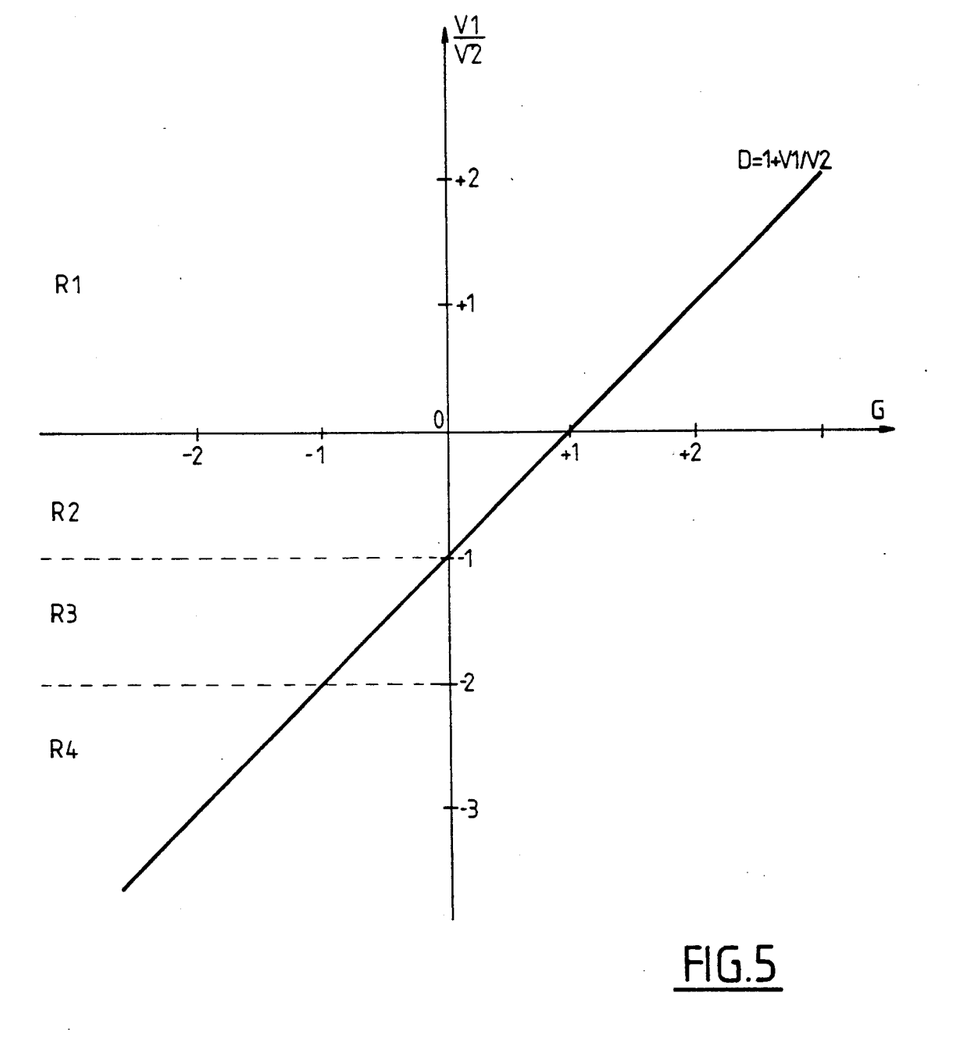
FIG. 5 is a graph showing how the magnification of the spectral image is varied in an installation as shown in FIG. 4.

Reference is now made to FIG. 5 which shows how the magnification of the dispersed spectral image varies in compliance with a predetermined law in an installation as shown in FIG. 4.

The velocity components V1, V2, and V3 along the Y-axis OY are taken to be zero, i.e. there is no deflection in a direction perpendicular to the direction in which spectral dispersion DS takes place. The velocity V3 of the electronic mask is equal to the velocity V1 of the optical mask.

To simplify, the width of the optical mask Afo is equal to the width of the electronic mask Afe, and consequently the optical and electronic masks have the same dimensions and the same displacement velocities (V1=V3).

The gratings Re and Rs are displaced respectively at velocities V1 and V2.

The magnification G of the dispersed spectral image is plotted along the X-axis Ox and the ratio of the displacement velocities V1/V2 is plotted up the Y-axis OY.

Under the conditions specified above, the Applicants have observed that the magnification G of the dispersed spectral image varies along a straight line D having the equation $D = 1 + V1/V2$.

More precisely, for a positive ratio V1/V2, the magnification G has a value greater than 1 (R1); i.e. the dispersed spectral image is enlarged over the set J1.

For a ratio V1/V2 lying in the range −1 to 0, the magnification G has a value lying in the range 0 to 1 (R2); i.e. the dispersed spectral image on the set J1 is compressed.

For a ratio V1/V2 lying in the range −2 to −1, the magnification G has a value lying in the range 0 to −1 (R3); i.e. the dispersion is both compressed and inverted.

For a ratio V1/V2 less than −2, the magnification G has a value less than −1 (R4); i.e. the dispersed spectral image is enlarged on the set J1.

Most advantageously, the magnification G reduces the level of interfering light and the bands corresponding to inteferring images due to diffusion in the dispersers and the optical surfaces, and also due to intrinsic or induced noise due to unused regions of the detector and to photon noise related to the continuous background and to interfering diffusion in the optics.

Most advantageously, the magnification G remedies drawbacks due to the discrete structure of the detector components in the detection module.

Figure 6:
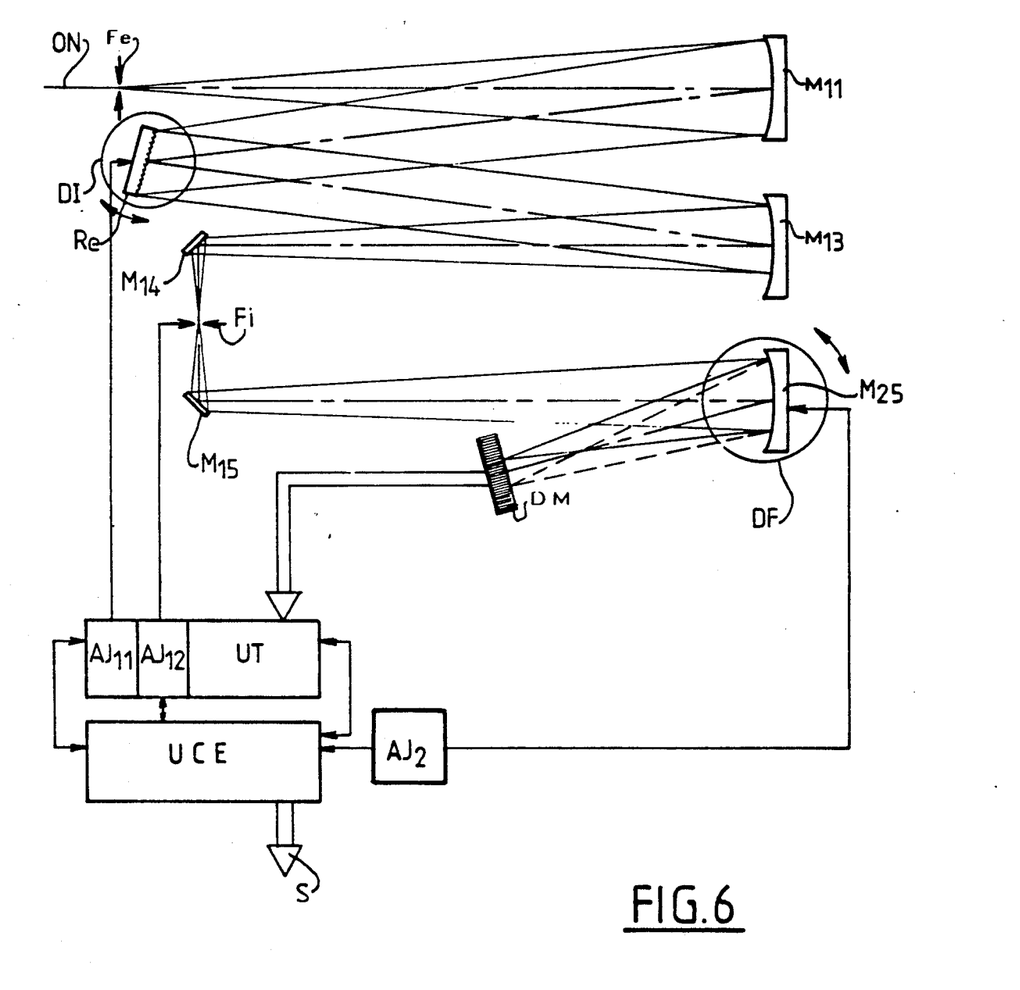
FIG. 6 is a diagram of a dispersive spectrometry installation having a rotating mirror type deflector stage and in accordance with the invention.

Reference is now made to FIG. 6 which shows an example of an installation of the invention having a mirror type deflector stage.

This figure has the same essential components as FIG. 4 and it differs only in that the dispersive grating type deflector stage is replaced by a deflector stage DF of the type having a mirror M25.

Under the control of the electronic control unit UCE, the control means AJ2 displace the mirror M25 at a controlled velocity V2 to displace the spectral image relative to the detection module DM.

It should be observed that when the grating Re is replaced by the mirror M25, the final resolution does not benefit from dispersion in the deflector stage, and it is therefore limited by the diffraction and the slit width of the dispersive stage on its own.

Figure 7:
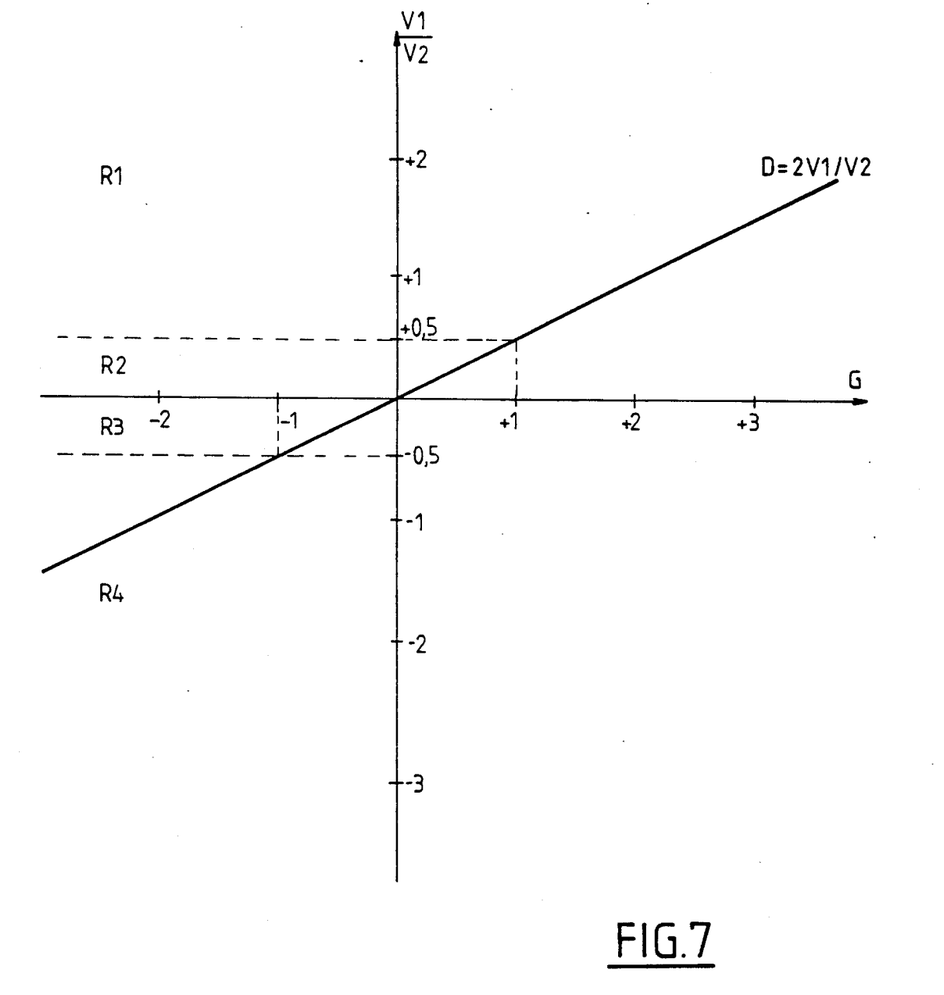
FIG. 7 is a graph showing how the magnification of the spectral image varies in an installation as shown in FIG. 6.

Reference is now made to FIG. 7 which shows how the magnification of the dispersed spectral image varies in accordance with a predetermined law in an installation as shown in FIG. 6.

The magnification G of the dispersed spectral image is plotted along the X-axis OX, and the ratio of the displacement velocities V1/V2 is plotted up the Y-axis OY.

Under the above-specified conditions, the Applicants have observed that the variation in the magnification G of the dispersed spectral image follows a straight line D having the equation $D = 2\, V1/V2$.

More precisely, for a ratio V1/V2 greater than 0.5, the magnification G has a value greater than 1 (R1), i.e. the dispersed spectral image is enlarged on the set J1.

For a ratio V1/V2 lying in the range 0 to 0.5, the value of the magnification G lies in the range 0 to 1 (R2); i.e. the dispersed spectral image is compressed on the set J1.

For a ratio V1/V2 lying in the range −0.5 to 0, the value of the magnification G lies in the range 0 to −1 (R3); i.e. the dispersion is both compressed and inverted.

For a ratio V1/V2 less than −0.5, the value of magnification G is less than −1 (R4); i.e. the dispersed spectral image is enlarged on the set J1.

Figure 8:
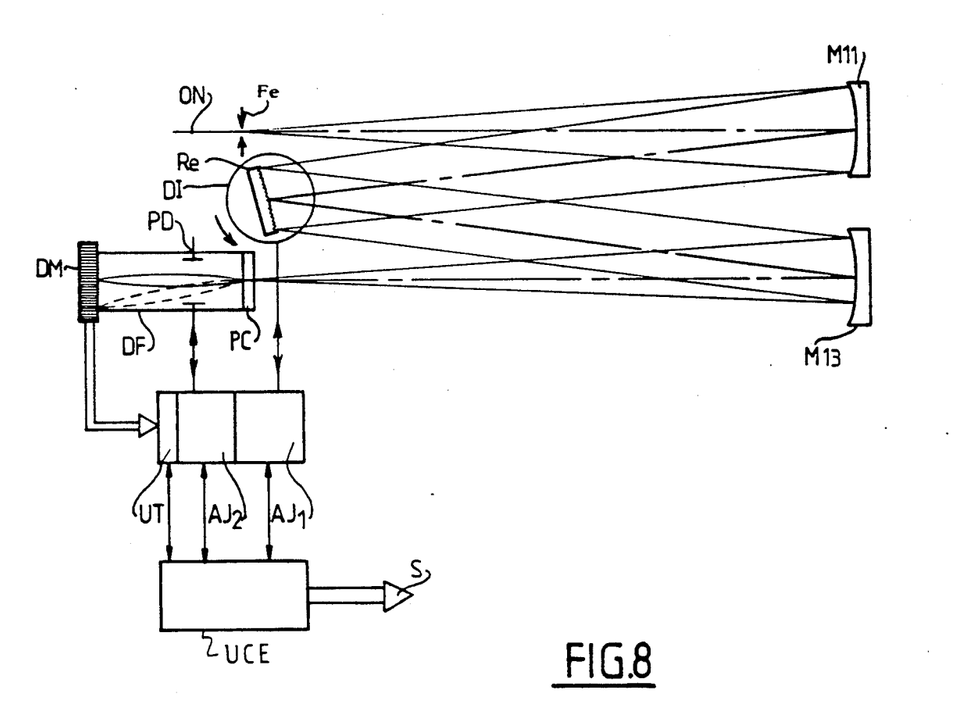
FIG. 8 is a diagram of a dispersive spectrometry installation having an electronic type deflector stage and in accordance with the invention.

Reference is now made to FIG. 8 which shows an example of an installation of the invention having an optoelectronic type deflector stage.

This figure has the same essential components as FIGS. 4 and 5 and it differs therefrom only in that the dispersive grating type deflector stage or the mirror type deflector stage is replaced by an optoelectronic type deflector stage DF.

The multi-channel detector module DM is preceded by a deflector stage DF comprising a photocathode PC receiving the dispersed spectral image delivered by the dispersive stage DI directly via the mirror M13.

Electrons are accelerated and deflected by deflection plates PD towards a micro-channel plate (not shown) which performs amplification by secondary emission. The secondary electron beams are accelerated and strike a phosphor screen which is optically coupled to the detector components.

Under the control of the electronic control unit UCE, the control means AJ2 alter the potentials of the electron deflection plates PD at a controlled velocity V2 to displace the spectral image relative to the detection module DM.

It should be observed that with non-zero deflection along the Y-axis OY, it is possible to shut off the detector components rapidly, thereby making it possible to improve the time resolution of a spectrometric installation.

This improvement is advantageous when the deflection is of the optoelectronic type as described with reference to FIG. 8 since it makes it possible to avoid the "smearing" effect due to the decay time of the phosphors.

It should be observed that when the widths of the transmission windows of the optical mask Mo and of the electronic mask Me are much greater than the width Ael of a single detector component EL in the detection module DM, and when the displacement velocity V2 of the deflector stage DF is equal to 0, then the spectrum window isolated by the optical mask Mo of the dispersive stage DI moves at a velocity V1 to cause a dispersed spectral image to enter the deflector stage in such a manner as to illuminate a particular set of detector components J1 in stationary manner.

In this case, if the laws applied to dispersion and to displacement are identical, then the resulting spectrum has the same dispersion and the same spectral resolution as it would in conventional operation, but the level of interfering light is reduced in proportion to the areas of optical mask Mo and of the electronic mask J1.

For non-zero displacement velocity V2 of the grating Rs in the deflector stage, it appears that while the spectrum window isolated by the optical mask Mo is moving through the spectrum at a velocity V1, the dispersed spectral images move over the detector module Dm at the velocity V2. This may cause different radiation received by each of the detector components in the detector module to be mixed up, thereby scrambling the spectra.

However, under these circumstances this can be remedied by replacing the continuous linear and/or rotary displacements of the optical components of the dispersive and deflector stages at controlled velocities V1 and V2 by discontinuous displacements that are synchronized with the signal processor means UT.

For example, the various spectrum fractions are analyzed step by step in different read cycles without optical superposition, and the signals corresponding to each detector read are stored separately by the processor means UT.

Subsequent computer processing serves to reconstitute a composite spectrum taking account of all of the data obtained in this way.

This operation gives rise to several improvements since sampling at a plurality i of points in each of r successive integration periods provides a set of ir intensity measurements.

If the displacement pitch q between each of the integrations is less than the width Ael of a single detector component EL, sampling the spectrum line profiles over a larger number of points makes it possible to reduce the loss of resolution due to the discrete structure of the detector.

In the ideal case, the spectral resolution is then improved by a factor of Ael/q.

If the displacement pitch q between each integration lies in the range: the width of a single detector element Ael to the width of the detection module; then reconstitution by rejuxtapositioning the various portions of the spectrum serves firstly to enlarge the spectral field and secondly to smooth small differences in sensitivity between the detector components of the detection module.

In addition, optical vignetting effects giving rise to variation in intensity of the bands between the center and the edge of the field are reduced.

The velocities V1, V2, and V3 of the joint control of the spectral band (optical mask), of the displacement of the spectral image, and of the processor means (electronic mask) are adapted, as described above, both along a direction parallel to the spectral dispersion DF and along a direction perpendicular to the spectral dispersion DS.

By combining adaptation in these two directions it is possible to achieve any relative displacement between the dispersed spectral images and the plane of the detection module.

Advantageously, charge transfer detectors make it possible to perform the equivalent of adaptation along these two directions OX and OY by transferring frames or by transferring rows by purely electronic methods.

When the horizontal component (OX) of the displacement velocity V3 of the optical mask is different from its vertical component (OY), the displacements of the electronic masks are then discontinuous and synchronized with the periods during which the detection module is shut off.

The displacement pitch along the axis OX parallel to spectral dispersion is preferably selected to correspond to splitting up the optical spectrum into juxtaposed spectral zones. The displacement along an axis perpendicular to the spectrum dispersion serves to store spectral zones on parallel strips of the matrix of detector components.

Continuous displacements of the electronic mask may be envisaged when the height of the electronic mask is of the same order as the height of a detector component. The spectra then appear in the form of a sloping strip.

In a "high resolution" example of operation, the inlet slit Fe and the intermediate slip Fi are chosen to have the same narrow width, e.g. a few tens of micrometers. The optical mask Mo then isolates a narrow spectral window whose width is limited in this case by diffraction only.

The dispersive grating Re (advantageously the dispersive stage includes two dispersive gratings) is displaced by rotation at an angular velocity V1, thereby displacing the window isolated by the optical mask Mo parallel to the dispersion DS at V1 in the plane of the detection module.

The deflector grating RS is displaced by being rotated, thereby producing displacement of spectral images over the detection module at a velocity V2 parallel to the spectral dispersion and in the same direction as the velocity V1.

As a result, the spectrum is reconstituted sequentially in the detector plane which at any one instant receives only a narrow image corresponding to the width of the narrow band defined by the optical mask Mo.

Consequently, the apparent dispersion of the installation of the invention is increased relative to the apparent dispersion of a conventional installation in which the optical components are fixed during signal acquisition.

In addition, the spectral resolution of the invention is not limited by the discrete structure of the detection module since the spectrum line profiles may be spread out at will over a larger number of detector components. In addition, sampling takes place over a larger number of points.

Thus, the spectral resolution of the installation is limited merely as a function of the inlet slit and the intermediate slit.

In conclusion, the installation of the invention makes it possible to approach the theoretical intrinsic resolving power of the dispersive gratings.

Naturally, the invention is not limited to the embodiments described, but on the contrary extends to any variant included in the scope of the following claims.

We claim:

1. A spectrometry installation comprising:
    an inlet for receiving a beam of electromagnetic radiation to be analyzed;
    optical filter means for receiving the inlet beam, comprising at least one dispersive stage for delivering a dispersed spectral image of said beam, which image is limited to a selected spectral bandpass;
    a multi-channel detection module comprising a plurality of detector components receiving said dispersed spectral image;
    processor means for analyzing the signals detected by said detector components:
    wherein:
    the installation comprises further:
    at least one deflector stage;
    first control means for controlling the dispersive stage in order to define said dispersed spectral image in center frequency and in bandpass width;
    second control means for controlling the displacement of said selected spectral image in center frequency and in bandpass width in order to enter said selected spectral image in the deflector stage;
    third control means for controlling the displacement of the selected dispersed spectral image over the multi-channel detection module;
    an electronic control unit provided for controlling the first, second and third control means and the processor means in a plurality of operating modes, wherein for each operating mode, the electronic control unit adapting joint control parameters of said selected spectral bandpass, velocities of the displacements of the spectral image over the deflector stage and over the detection module, and parameters of the processor means isolating the useful signal in coincidence with the selected spectral bandpass, to comply with a law which is predetermined to obtain selected magnification of the spectral range analyzed by a particular set of detector components.

2. An installation according to claim 1, wherein for each operating mode, the electronic control unit adapts the joint control parameters of the selected spectral band, of the displacement of the spectral image, and of the processor means to comply with a law which is predetermined to obtain selected magnification of the spectral image on the particular set of detector components.

3. An installation according to claim 2, wherein the joint control parameters of the selected spectral band, of the displacement of the spectral image, and of the processor means are adapted continuously, thereby making it possible to continuously vary the selected magnification of the spectral image on the particular set of detector components.

4. An installation according to claim 2, wherein the joint control parameters of the selected spectral band, of the displacement of the spectral image, and of the processor means are adapted sequentially, thereby making it possible to sequentially vary the selected magnification of the spectral image on the particular set of detector components.

5. An installation according to claim 1, wherein the selected magnification of the spectral image enlarges the dispersion of said spectral image over the particular set of detector components.

6. An installation according to claim 1, wherein the selected magnification of the spectral image contracts the dispersion of said image on the particular set of detector components.

7. An installation according to claim 1, wherein the deflector stage possesses at least one dispersive optical component selected from the group consisting of diffraction gratings, prisms, lenses, plane mirrors, both spherical and aspherical mirrors, holographic system, slits, interferometers, detector component intensification systems coupled where appropriate with shutter means for the detector components, slit scanning cameras, optical magnification systems, and combinations thereof.

8. An installation according to claim 7, wherein the deflector stage is housed in the detection module.

9. An installation according to claim 1, wherein the detection module comprises N detector components disposed in a row extending parallel to the dispersion of the beam of electromagnetic radiation to be analyzed, and wherein the selected magnification of the spectral image over the particular set of detector components is parallel to said dispersion of the beam of electromagnetic radiation.

10. An installation according to claim 1, wherein the optical filter means comprise order separator means suitable for being controlled by the electronic control unit.

11. A spectrometry installation comprising:
    an inlet for receiving a beam of electromagnetic radiation to be analyzed;
    optical filter means for receiving the inlet beam and for delivering a dispersed spectral image of said beam, wherein said image is limited to a selected spectral band;

a multi-channel detection module including a plurality of detector components receiving said spectral image; and processor means for analyzing the signals detected by said detector components;

the optical filter means including at least one deflector stage;

first control means connected to said optical filter means and for defining said spectral band in a center frequency and in a band width;

second control means connected to said optical filter means and for displacing the spectral image over the multi-channel detection module;

an electronic control unit for controlling the first and second control means and the processor means in a plurality of operating modes, each of which includes joint control of said selected spectral bands, of the displacement of the spectral image, and of the processor means, to use a selected particular set of the detector components; and wherein the detection module comprises N detector components disposed in m rows extending parallel to the dispersion of the beam of electromagnetic radiation and in p columns disposed perpendicularly to the dispersion of said beam, and wherein the selected magnification of the spectral image over the m' particular rows and the p' particular columns of the particular set of detector components is parallel to the dispersion of the beam of radiation on said m' particular row and perpendicular to the dispersion of the beam of radiation over said p' particular columns.

* * * * *